(12) United States Patent
Mowatt et al.

(10) Patent No.: US 6,401,517 B1
(45) Date of Patent: Jun. 11, 2002

(54) HITCH CONTROL UNIT

(75) Inventors: Jeffrey William Mowatt, Essex; Paul Robert Scott, Warwickshire, both of (GB)

(73) Assignee: New Holland North America, Inc., New Holland, PA (US)

( * ) Notice: Subject to any disclaimer, the term of this patent is extended or adjusted under 35 U.S.C. 154(b) by 121 days.

(21) Appl. No.: 09/596,880

(22) Filed: Jun. 20, 2000

(30) Foreign Application Priority Data

Jun. 29, 1999 (GB) .............................................. 9915097

(51) Int. Cl.⁷ .............................................. B60K 20/00
(52) U.S. Cl. .......................................................... 73/1.79
(58) Field of Search .................................. 73/1.75, 1.79

(56) References Cited

U.S. PATENT DOCUMENTS 5,231,892 A  8/1993  Haight ........................ 74/523
5,300,918 A * 4/1994 Becker ........................ 338/162
6,041,868 A * 3/2000 Matus et al. .................... 172/2
6,196,327 B1 * 3/2001 Patel et al. ..................... 172/7

* cited by examiner

Primary Examiner—Eric S. McCall
(74) Attorney, Agent, or Firm—John William Stader; Larry W. Miller

(57) ABSTRACT

A hitch control unit for use in a tractor comprises a housing that defines an arcuate surface having a tangentially extending slot. An arm extending through the slot is rotatably mounted in the housing and connected to a transducer to produce a signal indicative of the position of the arm along the slot. A stop movably mounted in the housing defines a reference position for the arm along the slot, and a finger-actuated wheel rotatably mounted in the housing allows the position of the movable stop along the slot to be adjusted. The wheel has an internally screw threaded bore and is mounted in the housing for rotation about an axis that extends parallel to the slot and the adjustable stop is connected to an arcuate rack in screw threaded engagement with the bore in the wheel.

8 Claims, 3 Drawing Sheets

HITCH CONTROL UNIT

BACKGROUND OF INVENTION

1. Field of Art

The present invention relates to a hitch control unit for use in a tractor.

2. Description of Prior Art

U.S. Pat. No. 5,231,892 discloses a hitch control unit for a tractor that comprises a housing having a pair of sidewalls joined to an outwardly convex cover wall formed with a fore-aft extending slot. An arm that can be moved manually along the slot is connected to a transducer, such as a potentiometer, that produces an output signal indicating the desired position of the implement mounted on the hitch of the tractor. An adjustable stop is movable by means of a thumb wheel along the slot and defines an abutment for the transducer arm. After the arm has been moved to raise the towed implement, for example while the tractor is performing a steering manoeuvre, it can quickly be returned to its position in abutment with the stop so that the towed implement can be returned to its original position.

The control knob on the end of the transducer arm, by which it is manipulated by the tractor operator, can be pivoted on the arm out of abutment with the adjustable stop to allow the arm to be moved intentionally past the stop when necessary.

In U.S. Pat. No. 5,231,892, the thumb wheel that adjusts the position of the movable stop is mounted on the housing for rotation about an axis parallel to the pivoting axis of the lever. This makes it necessary to use a complex linkage to couple the thumb wheel to the adjustable stop. Since the linkage includes meshing gears and a toothed thumb wheel, a smooth, infinite adjustment of the stop is not possible. As the thumb wheel moreover is spring loaded to restrain unwanted movement of the movable stop, the wheel always has to be pushed downward against the spring force and maintained in the downward position before rotational movement thereof becomes possible.

SUMMARY OF THE INVENTION

With a view to mitigating the foregoing disadvantage, the present invention provides a hitch control unit for use in a tractor. The unit comprises a housing having an arcuate surface having a tangentially extending slot. There is an arm extending through the slot and rotatably mounted in the housing. A transducer is connected to the arm to produce a signal indicative of the position of the arm along the slot. There is a stop movably mounted in the housing to define a reference position for the arm along the slot. Finally, an adjustment wheel is rotatably mounted in the housing to adjust the position of the movable stop. The adjustment wheel has an internally screw threaded bore and is mounted in the housing for rotation about an axis that extends parallel to the slot. The adjustable stop is connected to or formed integrally with an arcuate rack in screw threaded engagement with the bore in the adjustment wheel.

Another disadvantage of the unit of U.S. Pat. No. 5,231,892, is that the use of a pivotable control knob on the end of the transducer arm to allow the stop to be bypassed is costly to implement and inconvenient to operate.

In a preferred embodiment of the invention, the arm connected to the transducer is resiliently bendable in a direction transverse to the slot in the housing to allow it to be deflected around the abutment presented by the adjustable stop when it reaches the reference position.

BRIEF DESCRIPTION OF THE DRAWINGS

The invention will now be described further, by way of example, with reference to the accompanying drawings.

DETAILED DESCRIPTION OF THE PREFERRED EMBODIMENT

Figure 1:
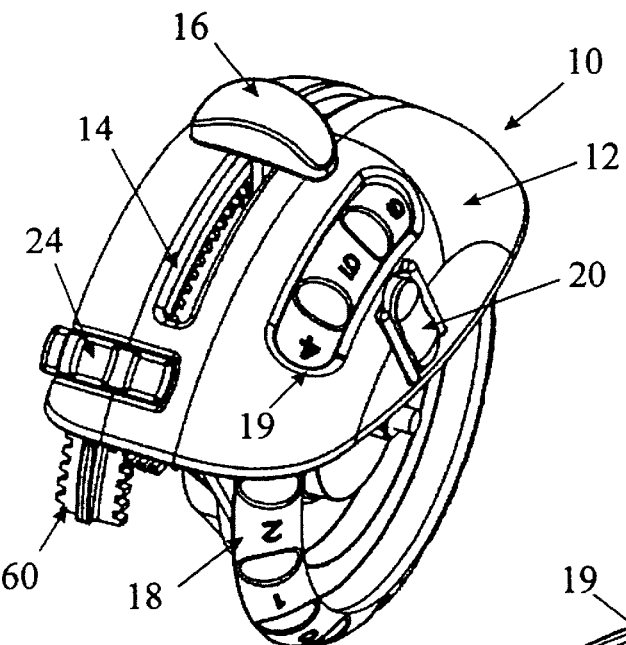
FIG. 1 is a perspective view from above of an assembled hitch control unit.
Figure 2:
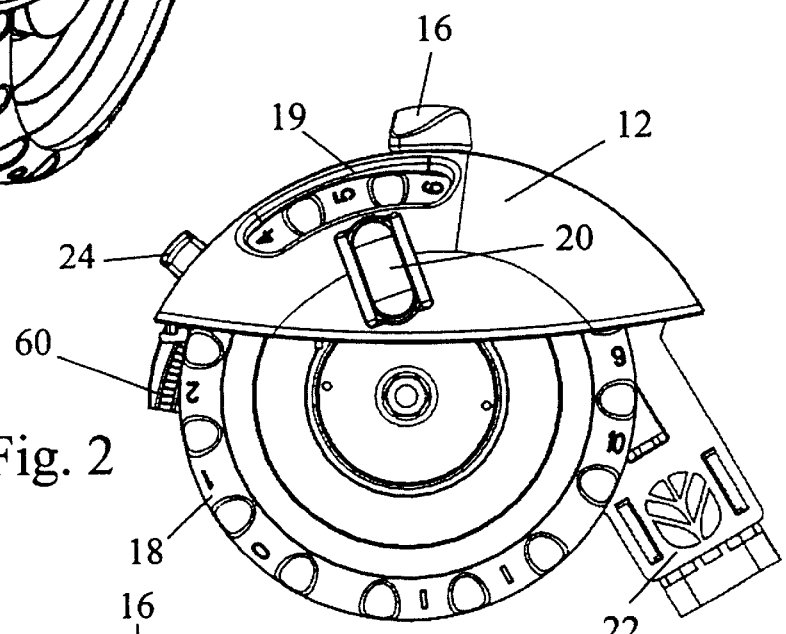
FIG. 2 is a view of the assembled hitch control unit as seen from one side.
Figure 3:
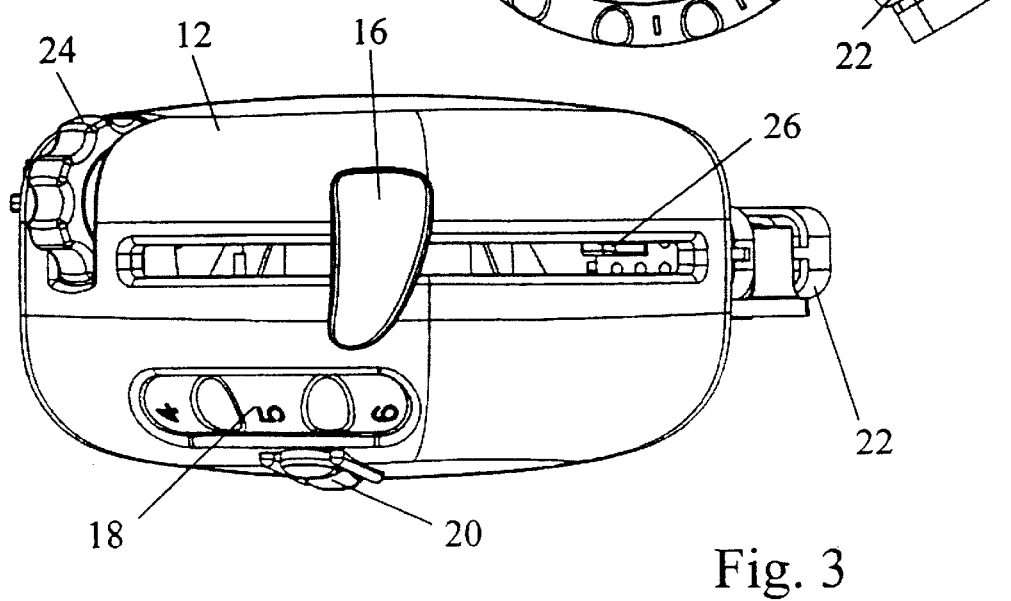
FIG. 3 is a plan view from above of the assembled hitch control unit.

The hitch control unit 10, shown in its assembled state in FIGS. 1 to 3, has a housing 12 formed with an arcuate upper surface containing an elongated slot 14. The control of the height or position of a hitch is effected by sliding a control knob 16 along the slot 14. Additionally, the hitch control unit 10 includes a rotatable numbered wheel 18 that can be manually turned through a second slot 19 in the housing 12 to act as a draft control. Draft and position control are well known modes of control of a tractor hitch and therefore need no further explanation. A switch 20 is set in an opening in the side of the housing 12 for rapid lowering and raising of the hitch.

Figure 4:
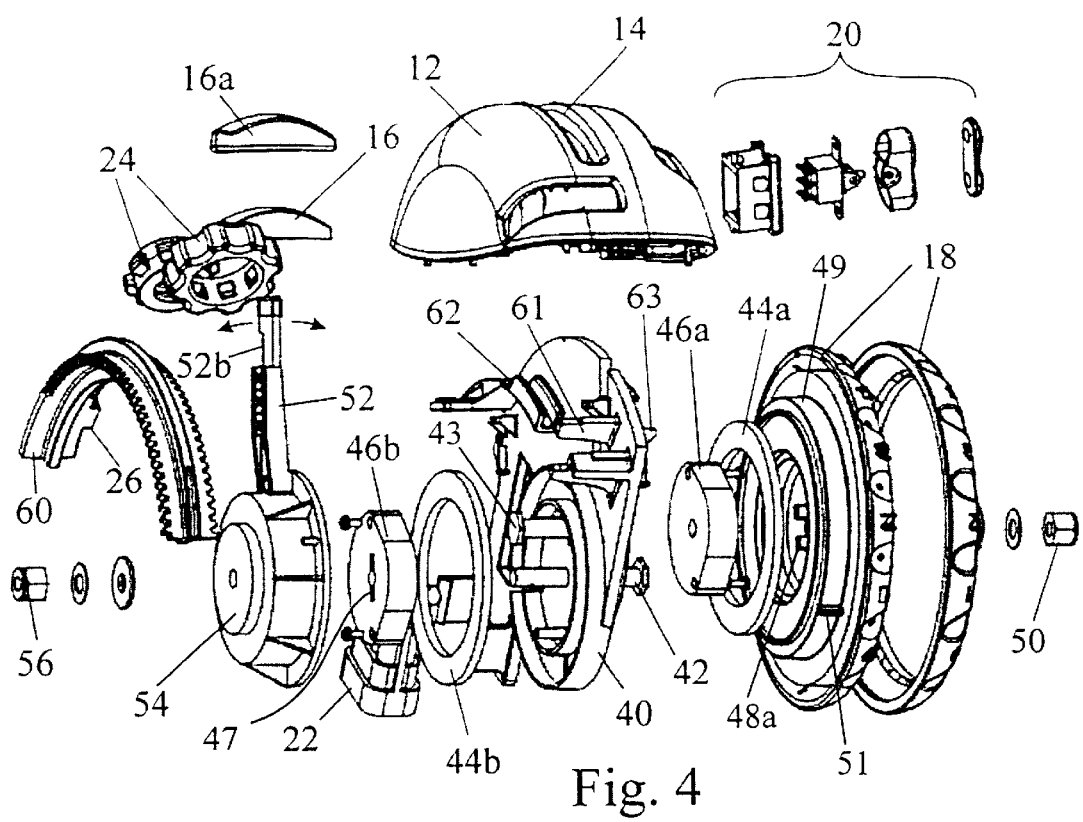
FIG. 4 is an exploded view of the hitch control unit.

As seen in FIG. 4, the knob 16 is mounted on an arm that extends radially from a hub 54. The wheel 18 and the hub 54 are operatively connected to respective separate transducers 46b and 46a (being potentiometers in the illustrated embodiment of FIG. 4) that produce an electrical output indicative of their position. The unit 10 has an electrical connector 22 containing contacts connected to the transducers 46a and 46b and to the contacts of the switch 20 on the one hand to provide electrical power to the devices and on the other hand to collect output signals corresponding to the positions of the control knob 16 and of the wheel 18 and to the setting of the switch 20.

It is sometimes desired to raise the hitch temporarily and then to return it to the same reference position. The setting of the reference position of the hitch is achieved by means of a finger operated adjustment wheel 24 that, as will be described in more detail below, moves a stop 26 parallel to the slot 14. The stop 26 presents an obstruction to the movement of the control knob 16 along the slot 14 at the reference position set by turning the adjustment wheel 24. The stop 26 limits the range of movement of the control knob 16 in the direction of lowering of the hitch but, if desired, by moving the control knob 16 to one side, it can be moved beyond the position of the stop.

The internal construction of the hitch control unit 10 will be described by reference to the exploded view of FIG. 4. The unit 10 comprises the housing 12, which is a one-piece plastics moulding (or eventually also could be a die cast element), and a support plate 40 on which the potentiometers 46a, 46b and the connector 22 are mounted. The potentiometers are of similar construction and are mounted one on each side of the support plate 40. A bolt 42 near the centre of the support plate 40 defines the axis of rotation of the potentiometer 46*b* connected to the hub 54, whereas a bolt 43, provided upwardly offset from the bolt 42, defines the axis of rotation of the potentiometer 46*a* connected to the wheel 18. The axes of rotation need not be offset and the bolts 42, 43 could be replaced by a single shaft extending on both sides of the support plate 40 and defining a single pivot axis for both potentiometers 46*a*, 46*b*. Each potentiometer comprises a body 46*a*, 46*b* that is respectively slid over the bolts 43, 42 and fixedly connected to the support plate 40. Each potentiometer 46*a*, 46*b* furthermore comprises a two-winged slot 47 (only one of which is shown in FIG. 4) for receiving axial projections 48*a*, 48*b*, eccentrically provided respectively on the wheel 18 and on the hub 54.

The potentiometers 46*a* and 46*b* are of conventional design and comprise a wiper arm moveable along an internal track. Moving the knob 16 actuates the wiper arms of the potentiometers 46*a*, 46*b* and the wheel 18, a movement that is transmitted through the axial projections 48*a*, 48*b* and the slots 47. The ends of the track and the wiper arm are connected to contacts in the electrical connector 22 which is further connected to the contacts of the switch 20 inset into the side of the housing 12.

The support plate 40 has opposite mounting faces onto which each potentiometer 46*a*, 46*b* is mounted. Around each potentiometer 46*a*, 46*b* there is mounted a friction disc 44*a* and 44*b* to which the draft control wheel 18, respectively the hub 54 is frictionally coupled. Each of the friction discs 44*a*, 44*b* is radially constrained by a flange protruding from the support member 40 which together with features on the wheel 18 or the hub 54, as the case may be, form a chamber within which the potentiometer resides thereby giving it greater protection.

More specifically, with reference to the wheel 18, it comprises an internal, axially extending rim 49 building a housing for the potentiometer 46*a*. In-between the wheel 18 and the support plate 40, the friction ring 44*a* is provided for offering some resistance to rotational movement of the wheel 18. A nut 50 fixes the wheel 18 onto the bolt 43 thereby clamping the ring 44*a* in-between the wheel 18 and the plate 40 with a desired force; this force being high enough to prevent unwanted movement of the wheel 18 eventually caused by vibrations of the tractor. A thrust spring (not shown) eventually also could be provided to maintain a constant force.

When the wheel 18 is rotated to adjust the desired draft force experienced by the tractor, the projections 48*a* rotate the wiper arm of the potentiometer 46*a* along the internal track thereby producing an electrical signal which is indicative of the position of the wheel 18. Two radially extending stops 51, of which only one is shown in FIG. 4, are provided angularly offset on the rim 49 and cooperate with an abutment stop 63 on the support plate 40 to limit the angular rotational motion of the wheel 18.

As already mentioned, the control knob 16 is connected to the arm 52 that extends radially from the hub 54. When the hub 54 is mounted by means of a nut 56 onto the bolt 42, it builds a cup-like housing for the potentiometer 46*b*. Comparable to the operation of the wheel 18, as the knob 16 moves along the slot 14, it rotates the hub 54 and through the axial projections 48*b*, the wiper arm of the potentiometer 46*b* is moved along its resistive track. In so doing, electrical signals are produced to indicate the position of the knob 16, which represents the desired position of the hitch relative to the tractor.

Channels (not shown) in the support plate 40 pass from each potentiometer chamber beneath the friction discs 44*a*, 44*b* to the main electrical connector 22 thereby allowing the wiring to pass out of the chamber.

The support plate 40 provides support and retention for the electrical connector 22 which can be easily fitted or removed without the need for any additional components due to features integral in the support plate 40.

The support plate 40 is further formed with two brackets 61 that extend from it, one on each side of the adjustment wheel 24 to provide additional support and axial constraint. Mating formations are also formed on the support plate 40 and the housing 12 to locate the support plate 40 with respect to the housing thereby improving the overall accuracy of the unit between the potentiometers and the end stops in the housing.

To improve the tactile properties of the draft control unit, the adjustment wheel 24 is formed in two parts, the inner part being of a relatively hard plastics material and the outer part being of a rubber like material having better frictional properties. Similarly, the control knob 16 is fitted with a rubber like cap 16*a*.

To facilitate manufacture, the outer part may be moulded over the inner part. Specifically for the draft control wheel 18, the base part comprises numbers or a graduation scale slightly projecting therefrom. The base part then is moulded over with a material of contrasting colour, without however moulding over the graduation scale to leave it uncovered. This gives the draft control wheel 18 visual feedback of its position that will not wear under the extreme conditions in which an agricultural tractor is operated.

Figure 5:
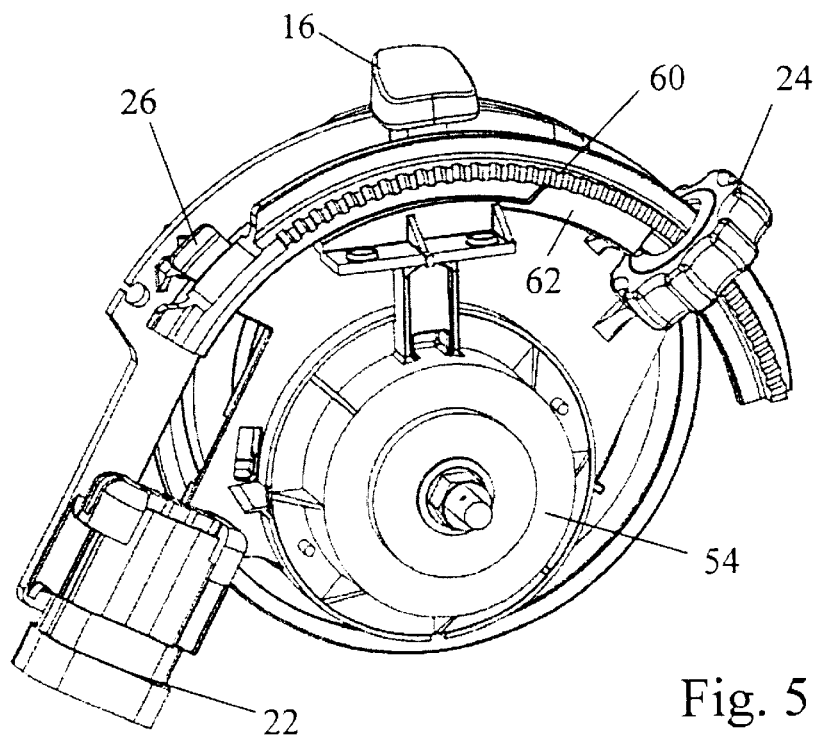
FIG. 5 is a side view of the hitch control unit with the housing omitted.
Figure 6:
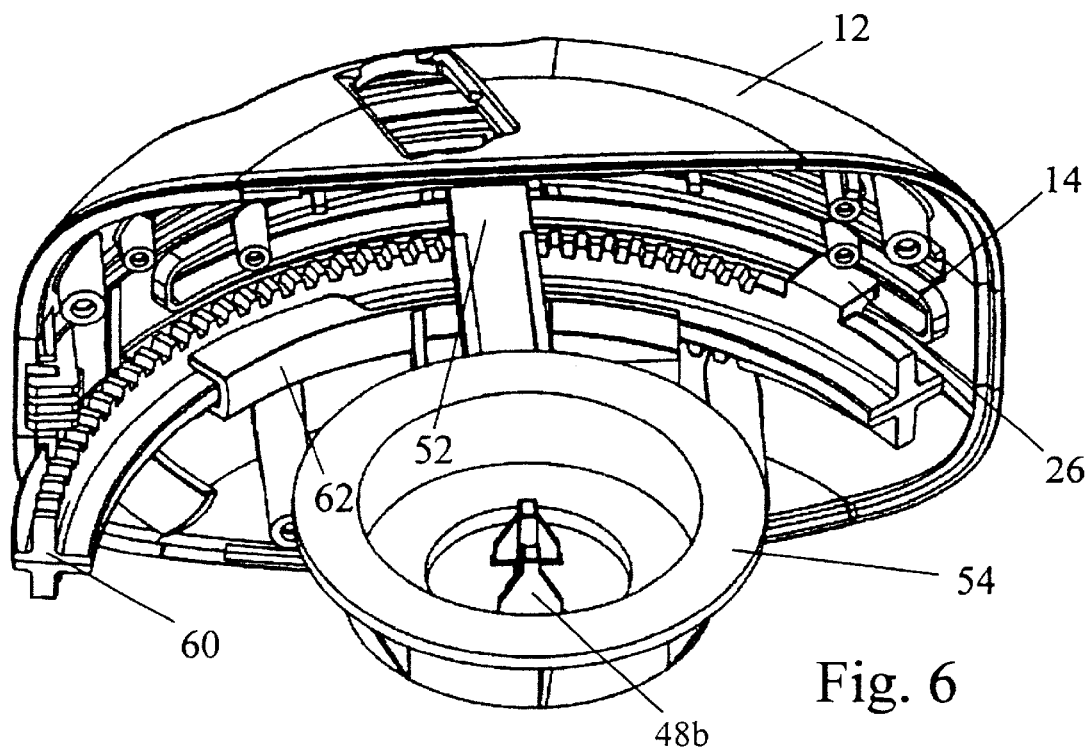
FIG. 6 is a perspective view of the housing from below with only some of the components of the hitch control unit in position.
Figure 7:
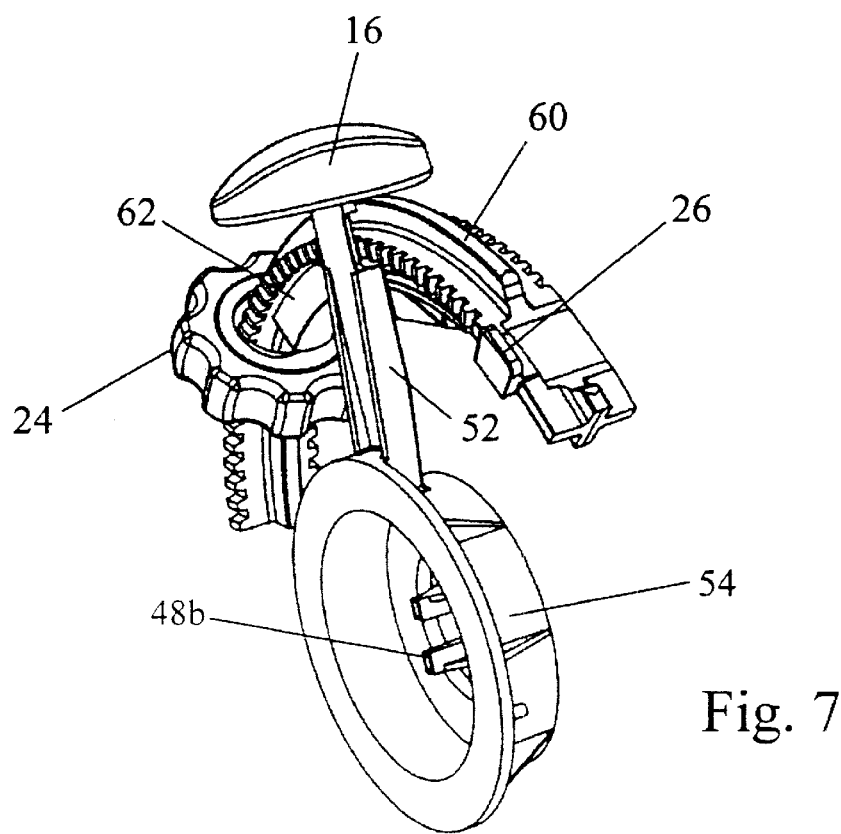
FIG. 7 is a schematic perspective view illustrating the operation of the adjustable stop.

The present invention is concerned primarily with the manner of providing an adjustable stop 26 along the slot 14 and the manner in which this is achieved will now be described by reference to FIGS. 5 to 7.

The stop 26 is formed as a projection from an arcuate rack 60 that acts as a lead screw. The arcuate rack 60 has a cruciform cross section with two radially extending limbs and two axially extending limbs. The axially extending limbs have serrated edges that act as a screw thread and are engaged in a matching thread within the inner part of the thumb wheel 24.

The inner radially extending limb is received in a guide channel 62 that is mounted on the underside of the housing 12. The guide channel 62 is itself arcuate and acts to trap the member 60 between itself and the underside of the housing 12. The underside of the housing in turn is provided with an arcuate groove (not shown) to receive the outer radially extending limb of the rack 60. As a result, as the wheel 24 is turned, the arcuate rack moves along an arc substantially parallel to the upper surface of the housing 12 and advances the stop 26 along the slot 14. As best seen in FIG. 5, the guide channel 62 comprises a cantilevered portion which is formed such that it exerts a spring force upwards onto the inner radially extending limb of the rack 60, to thereby create a slight frictional resistance between the rack 60 and its supporting structure. As such, the rack 60 is sufficiently braked against any unintended movement.

The arm 52 on which the control knob 16 is mounted, is flexible in the direction of the two small arrows in FIG. 4 and has a chamfered trailing edge 52*b* so that it is automatically deflected to one side when it is pushed against the stop 26.

In operation, when the driver of the tractor wishes to raise the towed implement attached to the hitch, for example when carrying out a steering manoeuvre, the knob 16 is moved away from its reference position resting on the stop 26 to the fully raised position. After the steering manoeuvre has been completed, the operator moves the knob back towards the fully lowered position of the hitch but the knob 16 will meet resistance when its arm 52 collides with the stop 26. Fine adjustment to this reference position can be made by moving the stop 26 using the finger operated wheel 24. If the hitch is being slightly raised, then the movement of the stop 26 will automatically be transferred to the control knob 16. Fine control in the opposite direction is effected by moving the stop 26 and then pushing the control knob up to the new position of the stop 26.

If the hitch needs to be lowered temporarily for any reason beyond the position set by the stop 26, then the stop 26 can be bypassed by pushing the control knob 16 to one side, bending its arm 52 away from the stop 26. When the control knob 16 is subsequently pushed in the opposite direction past the stop 26, the chamfered edge 52b of the arm 52 will act to deflect the arm 52 to one side so that it may ride over the stop 26.

It will be obvious to those skilled in the art that various changes may be made without departing from the scope of the invention and the invention is not to be considered limited to what illustrated in the drawings and described in the specification.

What is claimed is:

1. A hitch control unit for use in a tractor comprising
   a. a housing defining an arcuate surface having a tangentially extending slot;
   b. an arm extending through the slot and rotatably mounted in the housing;
   c. a transducer connected to the arm to produce a signal indicative of the position of the arm along the slot;
   d. a stop movably mounted in the housing to define a reference position for the arm along the slot; and
   e. an adjustment wheel rotatably mounted in the housing to adjust the position of the movable stop, characterised in that the adjustment wheel has an internally screw threaded bore and is mounted in the housing for rotation about an axis that extends parallel to the slot and in that the adjustable stop is connected to or formed integrally with an arcuate rack in screw threaded engagement with the bore in the adjustment wheel,
   wherein the arm connected to the transducer is moveable in a direction transverse to the slot in the housing to allow the arm to be deflected around an abutment presented by the adjustable stop when the abutment reaches the reference position and has a ramped surface thereon, such that when the arm is moved in one direction in relation to the adjustable stop, the arm is automatically deflected to override the stop,
   wherein the arcuate rack has a cruciform cross section having a series of radially and axially extending limbs, of which an edge of at least some of the limbs are serrated to act as a screw thread and the arcuate rack is guided between the underside of the housing and an arcuate guide channel secured to the underside of the housing,
   wherein the arcuate guide channel comprises a spring cantilever which resiliently traps the arcuate rack against the underside of the housing, and
   wherein the position of the arm extending through the slot corresponds to a desired position of a tractor hitch and having a separate draft control wheel mounted within the housing.

2. The hitch control unit as claimed in claim 1, wherein the draft control wheel is mounted on the same support as the hitch control arm, the axes of rotation of the transducer connected respectively to the control wheel and the hitch control arm extending coaxial or parallel to each other.

3. The hitch control unit as claimed in claim 2, wherein a portion of the draft control wheel extends through a window in the housing through which numbers or graduations on the wheel may be seen.

4. The hitch control unit as claimed in claim 3, wherein the draft control wheel is formed of a base part having the numbers or graduation scale formed thereon and an upper part of a material of contrasting colour moulded over the base part to leave the formed areas uncovered.

5. The hitch control unit as claimed in claim 4, in which means are provided for frictionally resisting rotation of the draft control wheel.

6. The hitch control unit as claimed in claim 5, in which means are provided for frictionally resisting rotation of the hitch control arm.

7. The hitch control unit as claimed in claim 1, wherein the housing comprises a central support plate, the transducers being connected to the support plate on opposite sides thereof.

8. The hitch control unit as claimed in claim 7, wherein the arm extending through the slot is connected to a hub that builds a chamber for the associated transducer.

* * * * *